July 22, 1952  E. P. DU PONT  2,603,979

BELT DISENGAGING MECHANISM

Filed Aug. 2, 1948  2 SHEETS—SHEET 1

INVENTOR.
ELEUTHERE PAUL DU PONT
BY
ATTORNEYS

July 22, 1952  E. P. DU PONT  2,603,979
BELT DISENGAGING MECHANISM
Filed Aug. 2, 1948  2 SHEETS—SHEET 2

INVENTOR.
ELEUTHERE PAUL DU PONT
BY
ATTORNEYS

Patented July 22, 1952

2,603,979

UNITED STATES PATENT OFFICE 2,603,979

BELT DISENGAGING MECHANISM

Eleuthere Paul du Pont, Montchanin, Del.; Equitable Trust Company and John Hemphill, executors of Eleuthere Paul du Pont, deceased, assignors to Benjamin Bonneau du Pont, Fairfield, Conn.

Application August 2, 1948, Serial No. 41,947

5 Claims. (Cl. 74—242.5)

This invention relates to belt drives. More particularly, it relates to a belt drive utilizing a V-belt and means for disengaging the V-belt from a pulley.

Where flat belts are used, it is well known to shift the driving belt from the driving pulley onto a loose pulley. Indeed, such an arrangement is one of the major benefits of a belt drive since other commonly used means for disconnecting a driving shaft and a driven shaft involve much greater complexity and cost. Despite the numerous advantages of a V-belt, including decreased width requirements and less slippage, it will be apparent that, when such a belt is used, the ability to shift the belt onto a loose pulley is lost. Thus other means for disengaging a V-belt from the driven pulley have been sought but heretofore a satisfactory solution has not been found.

It is, therefore, the broad object of this invention to provide means for disengaging a V-belt from a pulley.

An additional object of this invention is to provide means which will, in addition to disengaging a V-belt from a pulley, will provide positive means for reengaging the belt with the pulley.

These and other objects of this invention will be made apparent from a reading of the description in connection with the following drawings, in which.

Figure 1:
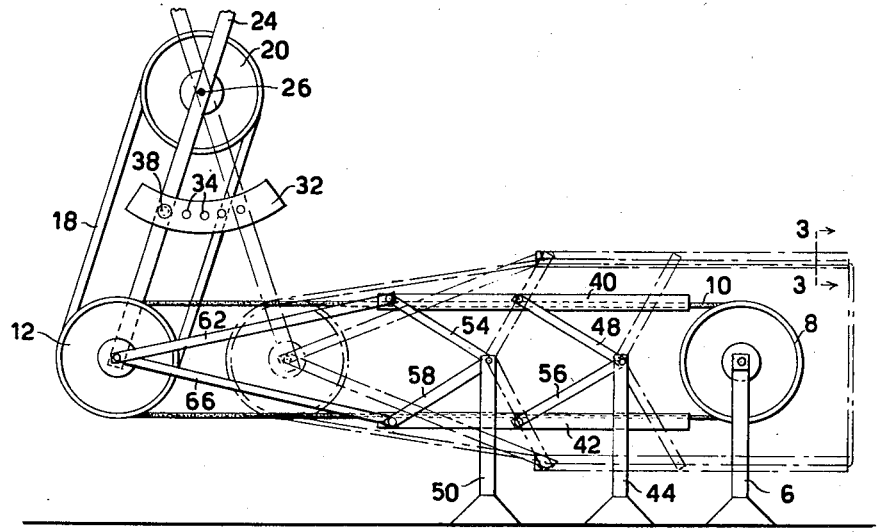
Figure 1 is a side elevation of the belt disengaging mechanism.
Figure 2:
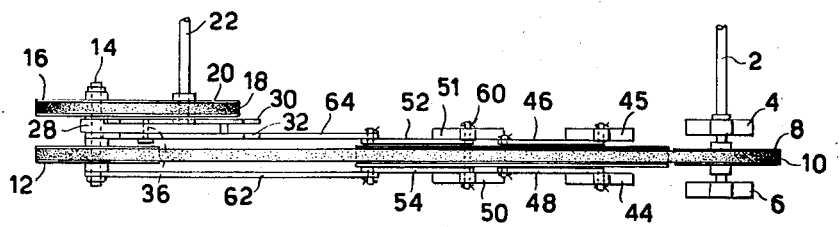
Figure 2 is a plan view of the belt disengaging mechanism shown in Figure 1.
Figure 3:
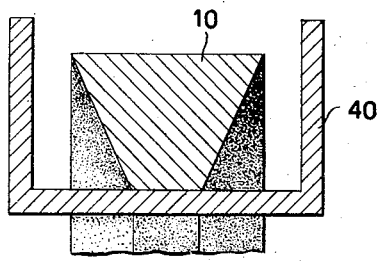
Figure 3 is a section taken on the line indicated at 3—3 in Figure 1.

As shown in Figures 1 through 3, a driving shaft 2 is mounted in vertical supports 4 and 6. Between vertical supports 4 and 6 is located driving pulley 8, which is fixedly secured to shaft 2.

A V-belt 10 runs between the driving pulley 8 and a driven pulley 12. Driven pulley 12 is fixedly secured to a shaft 14, to which is fixedly secured a pulley 16. A belt 18 connects pulley 16 to pulley 20 which is connected to shaft 22, which may be suitably supported and connected to the mechanism to be driven.

A lever 24 is pivotally connected to the shaft 22, at 26. The lever 24 extends downwardly to shaft 14 which it supports in a bearing at 28. Lever 24 passes between a pair of fixed metal guide plates 30 and 32. The guide plates have openings 34 which are located on a radius having shaft 22 as a center and so as to be in register with opening 36 in lever 24. A pin 38 passes through openings 34 and 36 to secure lever 24 in the desired position.

The lever 24 extends upwardly from pivot point 26 to a handle (not shown) which is utilized to move the lever 24 about pivot point 26 as desired.

An upper channel member 40 and a lower channel member 42 are located in the path of V-belt 10, the belt passing normally clear of the bottom and top of the channel members 40 and 42, respectively, but between the sides of these members. Channel member 40 is connected to vertical support members 44 and 45 by levers 48 and 46, respectively, and to vertical support members 50 and 51 by levers 54 and 52, respectively. Channel member 42 is connected to vertical support members 44 and 45 by lever 56 and an identical lever on the opposite side of the channel member which is not shown and is connected to vertical support members 50 and 51 by lever 58 and an identical lever on the opposite side of the channel member which is not shown. All of these levers connecting the channel members 40 and 42 to the vertical support members 44, 45, 50 and 51 are pivotally connected to both the channel members and the vertical support members, being retained in position by means of cotter-pins 60 to facilitate their ready removal.

Channel member 40 is connected to shaft 14 by a pair of oppositely disposed levers 62 and 64. Channel member 42 is similarly connected to shaft 14 by a pair of oppositely disposed levers 66 and a lever, not shown, which is identical and oppositely disposed to lever 66. The levers connecting the channel members 40 and 42 to shaft 14 are pivotally connected to both shaft 14 and the channel members.

When it is desired to disengage the V-belt 10 from the driving pulley 8, pin 38 is removed and lever 24 is pivoted at 26 so as to move pulley 12 towards pulley 8, thus reducing the distance between these two pulleys and providing slack in belt 10. Simultaneously, through the levers connecting channel shaped members 40 and 42 to shaft 14, the channel members 40 and 42 are forced outwardly and to the right as dictated by the levers connecting the channel members to support members 44, 45, 50 and 51. As the channel members advance towards the right, they take up the slack in belt 10, provided by the motion of pulley 12, and act to form a new path for belt 10 which carries it clear of pulley 4, as shown by the broken lines in Figure 1. It will be apparent that the disengaging mechanism acts to form a path for the V-belt 10 which gradually changes in shape and location so as to carry the V-belt clear of the driving pulley yet which does not, at any time, materially change in length. This insures that there will be no excessive slack so that the V-belt will always be located between the sides of the channel members 40 and 42. Thus, when it is desired to reengage the belt with the driven pulley, the reverse operation of the disengaging mechanism will, in a positive manner, guide the V-belt 10 back into the pulley 4.

Figure 4:
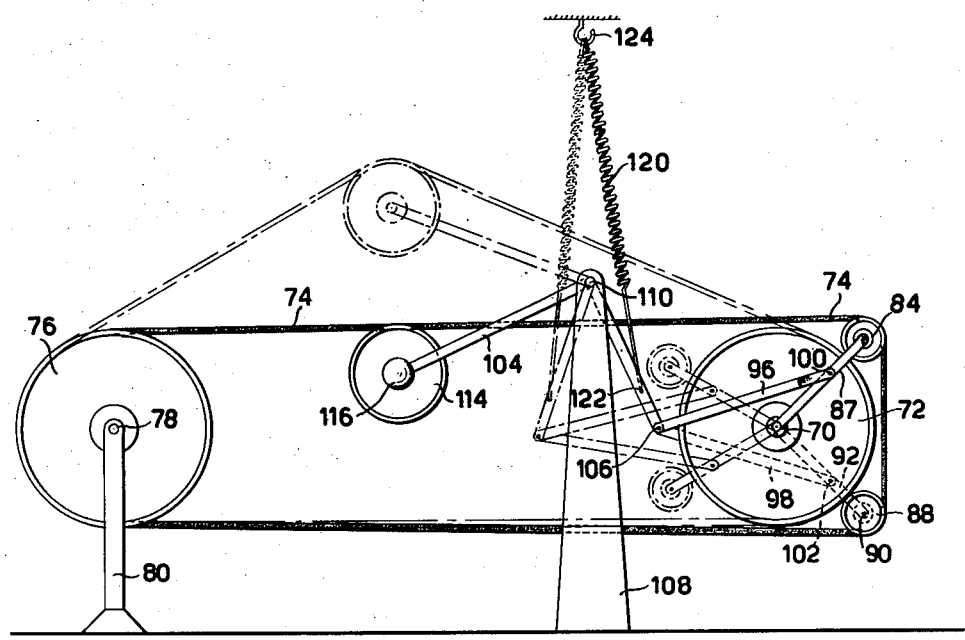
Figure 4 is a side elevation of a modified belt disengaging mechanism.
Figure 5:
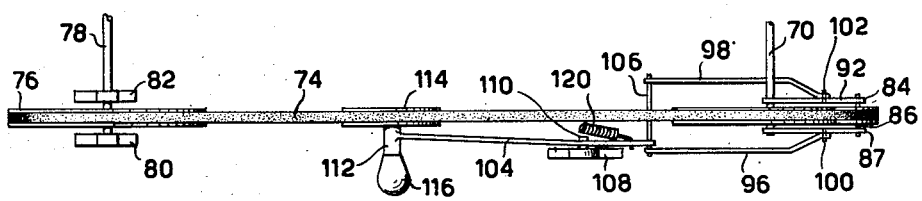
Figure 5 is a plan view of the mechanism shown in Figure 4.

In Figures 4 and 5, a second embodiment of this invention is illustrated. A driving shaft 70 carries a driving pulley 72. A V-belt 74 provides a driving connection between driving pulley 72 and driven pulley 76. Driven pulley 76 is mounted on a shaft 78 which is carried by supports 80 and 82. A pulley 84 is rotatably secured to rod 86 fixedly secured to lever 87. Pulley 88 is rotatably secured to rod 90 which is secured to lever 92. Levers 87 and 92 are pivotally secured to shaft 70. Levers 96 and 98 are pivotally secured to levers 87 and 92 at 100 and 102, respectively, and are pivotally secured to bell crank 104 through rod 106. Bell crank 104 is pivotally secured to support 108 at 110. Rod 112 secured to one end of bell crank 104 carries pulley 114 and handle 116. A spring 120 is secured to bell crank 104 at 122 and is supported by hook 124 at a point directly above bell crank pivot point 110.

The belt disengaging mechanism as shown in holding the V-belt 74 disengaged from driving pulley 72 by means of pulleys 84 and 88, which, by their position, force the belt 74 to take a path clear of the driving pulley. In order to reengage the belt 74 with the driving pulley, handle 116 is moved upwardly which causes the bell crank 104 to pull levers 96 and 98 to the left in turn causing lever 87 to move counterclockwise and lever 92 to move clockwise. This results in carrying pulleys 84 and 88 to the left and, after they have passed a vertical plane through shaft 70, towards each other until they become disengaged from the belt 74, at which point the belt will already have become engaged with driving pulley 72. Pulley 114 acts as an idler pulley to keep slack out of belt 74. It will be noted that spring 120 has the dual function of holding the belt disengaging mechanism in the disengaging position and also to keep the slack out of the belt through the medium of pulley 114.

It will be apparent that, in order to again disengage the belt from pulley 72, it is merely necessary to pull handle 116 downwardly which causes the elements of the mechanism to move in the reverse manner from that described above, resulting in the positioning of pulleys 84 and 88 as shown to carry the belt 74 clear of pulley 72.

Further advantages of the disengaging mechanism can be more fully appreciated by considering its application to the driving of a pump from an internal combustion engine which is the main power plant of a boat. In such an installation, the internal combustion engine has a complete lubricating system which requires no attention and hence may run unattended for long periods of time. If the belt which is to be used only intermittently is connected to the internal combustion engine by a flat belt loose pulley type drive or by a clutch mechanism and gearing, there results constant operation of the majority of the transmission parts. Generally, the installations of such transmission units require constant attention in order to insure their proper lubrication.

It will be apparent that the disengaging mechanism in accordance with this invention not only permits the use of a V-belt but further provides a power tranmsission unit which is completely at rest when not in use, thus eliminating, during the period of non-use, all wear and noise. When utilized to drive a boat pump as discussed above, it permits complete freedom from attention to the belt drive except as it is desired to use the pump.

The embodiments illustrated and described are, of course, merely illustrative and applicant does not desire to be limited thereby except as indicated by the following claims, it being apparent that numerous modifications within the scope of the invention may be made.

What I claim and desire to protect by Letters Patent is:

1. A driving pulley and a first driven pulley, a belt connecting said pulleys, a pair of channel members positioned between the reaches of said belt and respectively adjacent the opposite reaches of the belt, levers pivotally secured to support members and to said channel members, a shaft connecting the first driven pulley to a second driven pulley, levers connecting said shaft to said channel members, a belt connecting said second driven pulley to a third driven pulley, a lever pivoted on the axis of the third driven pulley and supporting said shaft so that the first driven pulley can be moved towards the driving pulley and the channel members can be moved apart to carry the belt between the driving pulley and the first driven pulley clear of the driving pulley and means to secure the lever pivoted on the axis of the third driven pulley.

2. A driving pulley and a driven pulley, a belt connecting said pulleys, a pair of members positioned between the reaches of the belt and respectively adjacent the opposite reaches of the belt, means connected to the driven pulley to move said pulley toward the driving pulley, and means connected to said driven pulley and said members to move said members apart to carry the belt clear of the driving pulley when said driven pulley is moved toward said driving pulley.

3. A driving pulley and a driven pulley, a belt connecting said pulleys, a pair of channel members positioned between the reaches of the belt and respectively embracing opposite reaches of th belt, means connected to the driven pulley to move said pulley toward the driving pulley, and means connected to said driven pulley and said channel members to move said channel members apart to carry the belt clear of the driving pulley when said driven pulley is moved toward said driving pulley.

4. A driving pulley and a driven pulley, a belt connecting said pulleys, a pair of channel members positioned between the reaches of the belt and respectively adjacent the opposite reaches of the belt, means connected to the driven pulley to move said pulley toward the driving pulley, and means connected to said driven pulley and said channel members to move said channel members apart and toward the driving pulley to carry the belt clear of the driving pulley when said driven pulley is moved toward said driving pulley.

5. A driving pulley and a driven pulley, a belt connecting said pulleys, a pair of members positioned between the reaches of the belt and respectively adjacent the opposite reaches of the belt, means connected to the driven pulley to move said pulley toward the driving pulley, and means connected to said driven pulley and said members to move said members when said driven pulley is moved.

ELEUTHERE PAUL DU PONT.

REFERENCES CITED

The following references are of record in the file of this patent:

UNITED STATES PATENTS

| Number | Name | Date |
|---|---|---|
| 367,891 | Canning | Aug. 9, 1887 |
| 402,758 | Medart | May 7, 1889 |